United States Patent Office 2,696,045
Patented Dec. 7, 1954

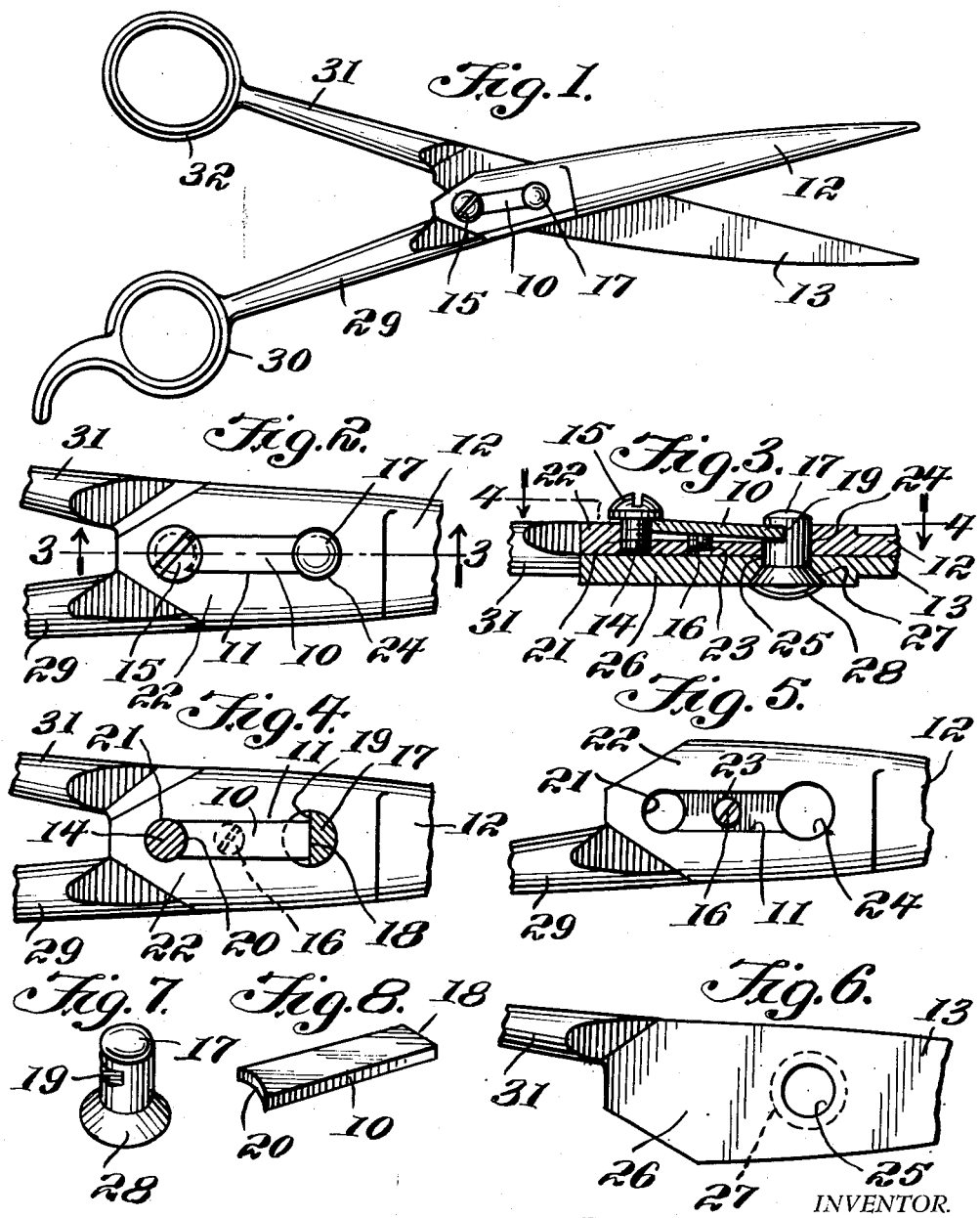

2,696,045

TENSION ADJUSTED SCISSORS

Fred D. Blodgett, Hallowell, Maine

Application December 5, 1952, Serial No. 324,309

3 Claims. (Cl. 30—269)

This invention relates to scissors or shears wherein a pair of cutting blades with handles are pivotally connected with a screw or rivet, and in particular a pair of scissors having a rivet with a conical-shaped head positioned in a countersunk opening with a tension plate positioned in a slot in one of the blades and having one end extended into a notch in a side of the rivet and the other adjustably held by a screw wherein with the plate bearing against an adjustable fulcrum tension on the rivet pivotally connecting the blades is adjustable by the screw.

The purpose of this invention is to provide an improved construction whereby a rivet pivotally connecting the blades of a pair of shears is continuously held in tension.

Various devices have beeen provided for taking up wear developing between blades of a pair of shears and although the conventional pivot is in the form of a screw threaded in one of the blades, screws mounted in this manner work loose and is difficult to hold the screws with lock or spring washers whereby the blades are maintained in cutting relation, continuously. With this thought in mind this invention contemplates a small plate fulcrumed on an adjusting screw with one end extended under the head of a take-up screw and with the opposite end extended into a notch of a rivet connecting the blades of a pair of shears, whereby play developing between the blades is taken up by tension in the plate.

The object of this invention, is therefore, to provide mechanical means adapted to be incorporated in a blade of a pair of shears whereby by turning an adjusting screw wear developing between cutting blades of a pair of shears is readily taken up.

Another object of the invention is to provide a tension device for readily taking up wear developing between blades of cutting shears in which the device is adapted to be installed in shears now in use.

A further object of the invention is to provide a pair of shears having tension adjusting means in combination with a pivotal connection thereof in which the shears are of a simple and economical construction.

With these and other objects and advantages in view the invention embodies a pair of cutting blades having extended handles with a small bar or plate positioned in a slot in the outer surface of one of the blades and with one end of the plate extended into a notch in a rivet pivotally connecting the blades and the opposite end extended under the head of an adjusting screw threaded into the blade in which the plate is positioned.

Other features and advantages of the invention will appear from the following description taken in connection with the drawing, wherein:

Figure 1 is an elevational view illustrating the shears and looking toward the blade in which the tension bar and adjusting screw are positioned.

Figure 2 is a detail with the parts shown on an enlarged scale also showing the adjusting screw and tension bar in the position as shown in Fig. 1 and wherein parts of the blades and handles are broken away.

Figure 3 is a longitudinal section through the pivotal connection of the shears taken on line 3—3 of Fig. 2.

Figure 4 is a view taken substantially on line 4—4 of Fig. 3 and with the adjusting screw and rivet shown in section.

Figure 5 is a detail showing one of the blades of the pair of shears, said blade having a recess therein for the tension plate and the tension plate and adjusting screw being omitted.

Figure 6 is a similar view showing the base of the cutting blade in which only the head of the rivet is positioned.

Figure 7 is a detail illustrating the rivet with which the blades are pivotally connected.

Figure 8 is a detail illustrating the tension plate or bar.

Referring now to the drawings wherein like reference characters denote corresponding parts the improved scissor tensioning device of this invention includes a bar 10 positioned in an elongated recess 11 in the face of a blade 12 of a pair of shears having a coacting blade 13, an adjusting screw 14 having a head 15, a fulcrum screw 16 and a rivet 17.

The plate 10 is formed, as illustrated in Fig. 8 with a flat end 18 adapted to extend into a slot 19 in the side of the rivet 17 and an arcuate end 20 that is positioned to nest against the surface of the adjusting screw 14, as illustrated in Fig. 4.

The adjusting screw 14 is threaded in an opening 21 in the base 22 of the blade 12 and the fulcrum screw 16 is threaded in an opening 23 also in the base of the blade and positioned between the opening for the adjusting screw 14 and an opening 24 for the rivet 17.

The opening 24 in the base 22 of the blade 12 is positioned to register with an opening 25 in a base 26 of the blade 13 and, as illustrated in Fig. 3 the outer end of the opening 25 is provided with a counterbore 27 in which a conical-shaped head 28 of the rivet 17 is positioned, as shown in Fig. 3.

With the parts formed in this manner the rivet 17 is inserted through the opening in the blade 13 and extended into the opening 24 of the blade 12 whereby the blades are pivotally connected and the rivet is secured in position with a key or plate 10, which extends into a slot 19 in the side of the rivet and which is held in tension by a screw 14 with a small screw 16 threaded in the inner surface of the base of the blade 12 providing a fulcrum whereby the end of the plate extended into the rivet holds the rivet in tension as the screw 14 is turned into the base of the cutting blade.

The blade 12 is provided with a handle 29 having a finger receiving ring 30 on the end thereof and the blade 13 is provided with a handle 31 having a finger receiving ring 32 on the end thereof.

With the parts formed in this manner the face of the upper blade 12 is provided with a recess adapted to receive the plate or bar 10 and the openings 21 and 23 are drilled and tapped therein. The rivet 17 is provided with the slot or notch 19 and with the rivet in the openings 24 and 25 the end of the plate 10 is inserted in the notch 19 and the screw 14 threaded in the opening 21. By adjusting the position of the screw 14 wear developing in the pivotal mounting is taken up continuously by tension of the plate 10 and should this not be sufficient the screw 14 is adjusted to add additional tension to the plate 10.

It will be understood that modifications, within the scope of the appended claims, may be made in the design and arrangement of the parts without departing from the spirit of the invention.

What is claimed is:

1. A pair of shears comprising cutting blades with handles extended from one of the ends thereof and having registering openings extended therethrough with the openings positioned at the intersection of the blades and handles, one of said blades having an elongated recess in the outer surface and said recess extended from the opening through the blade, a projection in said recess, a rivet having a slot in one side extended through said registering openings of the blades and positioned with the slot thereof opening into said recess, a screw having a head threaded into the cutting blade in which the recess is positioned and positioned in the end of the recess opposite to that in which the rivet is positioned, and a plate mounted in said recess and positioned with one end extended into the slot of the rivet and the other positioned below the head of the screw threaded in the blade and positioned in the recess, said plate being positioned to engage the projection in said recess.

2. A pair of shears comprising cutting blades with handles extended from one of the ends thereof and having registering openings extended therethrough with the openings positioned at the intersection of the blades and handle, one of said blades having an elongated recess in the outer surface and said recess extended from the opening through the blade, a projection in said recess, a rivet having a conical-shaped head and having a slot in one side and spaced from the end opposite to that on which the head is positioned, said rivet extended through the registering openings of the blades and the blade opposite to that in which the recess is positioned having a countersunk area at the end of the opening through the blade and in which the head of the rivet is positioned, a screw having a head threaded into the cutting blade in which the recess is positioned and positioned in the end of the recess opposite to that in which the rivet is positioned, and a plate mounted in said recess and positioned with one end extended into the slot of the rivet and the other positioned below the head of the screw threaded in the blade and positioned in the recess, said plate being positioned to engage the projection in said recess.

3. In a pair of shears, the combination which comprises cutting blades with handles extended from one of the ends thereof and having registering openings extended therethrough, the opening of one of said blades having a counterbore in the end extended from meeting surfaces of the blades and the opening of the other blade extended into an elongated recess positioned in the outer surface of the blade, a screw threaded in the blade, positioned midway of the length of the recess and having an end extended into said recess, said blade having a threaded opening at the end of the recess opposite to that in which the registering opening is positioned, a rivet having a head positioned in the counterbore of one blade extended through said registering openings and having a slot spaced from the end opposite to the end on which the head is positioned and located in one side whereby with the rivet turned in one position the slot opens into said recess, a plate positioned in said recess with one end extended into the slot of the rivet and with the opposite end positioned adjacent the threaded opening in the blade, and a screw having a head, said screw positioned in the threaded opening of the blade positioned in the end of the recess opposite to that in which the rivet is positioned whereby the head of the screw extends over the plate for retaining said plate in tension.

References Cited in the file of this patent

UNITED STATES PATENTS

| Number | Name | Date |
|---|---|---|
| 102,944 | Johnson | May 10, 1870 |
| 437,660 | Parkinson | Sept. 30, 1890 |
| 517,244 | Seymour | Mar. 27, 1894 |
| 642,029 | Wilkinson | Jan. 23, 1900 |
| 683,105 | Desnoyers | Sept. 24, 1901 |
| 907,464 | Conway | Dec. 22, 1908 |
| 949,166 | Wheeler | Feb. 15, 1910 |
| 1,718,907 | Jordan | June 25, 1929 |
| 2,171,468 | Blodgett | Aug. 29, 1939 |